US012565630B2

(12) United States Patent
Kim et al.

(10) Patent No.: US 12,565,630 B2
(45) Date of Patent: Mar. 3, 2026

(54) ANTIMICROBIAL CLEANING COMPOSITION COMPRISING A SYNERGISTIC COMBINATION OF SAGE AND EUCALYPTUS EXTRACT

(71) Applicants: HYUNDAI MOTOR COMPANY, Seoul (KR); KIA CORPORATION, Seoul (KR)

(72) Inventors: Heung Sik Kim, Seoul (KR); Kwang Mo Seong, Bucheon-si (KR); Mi Jung Yun, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 495 days.

(21) Appl. No.: 17/889,197

(22) Filed: Aug. 16, 2022

(65) Prior Publication Data

US 2023/0072793 A1 Mar. 9, 2023

(30) Foreign Application Priority Data

Aug. 18, 2021 (KR) ........................ 10-2021-0108449

(51) Int. Cl.

| | |
|---|---|
| ***C11D 7/44*** | (2006.01) |
| ***C11D 1/28*** | (2006.01) |
| ***C11D 3/382*** | (2006.01) |
| ***C11D 3/48*** | (2006.01) |

(52) U.S. Cl.

CPC ................ *C11D 3/382* (2013.01); *C11D 1/28* (2013.01); *C11D 3/48* (2013.01); *C11D 2111/20* (2024.01)

(58) Field of Classification Search

CPC .. C11D 1/28; C11D 3/48; C11D 3/382; C11D 2111/20; C11D 1/29; C11D 3/43; C11D 7/5077; C11D 7/44

See application file for complete search history.

(56) References Cited

U.S. PATENT DOCUMENTS

| | | | | | |
|---|---|---|---|---|---|
| 5,352,437 | A * | 10/1994 | Nakagawa | A61K 8/046 | 424/47 |
| 5,574,093 | A * | 11/1996 | States, Sr. | C05G 3/50 | 424/405 |
| 5,578,312 | A * | 11/1996 | Parrinello | A61K 8/9728 | 514/847 |
| 6,376,455 | B1 * | 4/2002 | Friedli | C11D 1/65 | 562/606 |
| 7,648,953 | B2 | 1/2010 | Bastigkeit et al. | | |
| 2004/0217200 | A1 * | 11/2004 | Otomo | C09K 3/30 | 239/337 |
| 2005/0196373 | A1 * | 9/2005 | Chen | A23L 21/25 | 424/728 |
| 2007/0065527 | A1 * | 3/2007 | Medvedev | A23B 2/783 | 514/3.3 |
| 2007/0269397 | A1 * | 11/2007 | Terada | A61Q 5/02 | 424/70.13 |
| 2010/0266516 | A1 * | 10/2010 | Cotrell | C11D 1/123 | 424/56 |
| 2012/0276021 | A1 * | 11/2012 | Kumar | A61Q 19/10 | 424/49 |
| 2017/0226345 | A1 | 8/2017 | Danjo | | |
| 2022/0175859 | A1 * | 6/2022 | Herrmann | A61Q 19/00 | |

FOREIGN PATENT DOCUMENTS

| | | | |
|---|---|---|---|
| JP | 2000212597 | A | 8/2000 |
| JP | 2000226600 | A | 8/2000 |
| JP | 2009013321 | A | 1/2009 |
| KR | 20000061074 | A | 10/2000 |
| KR | 20060052520 | A | 5/2006 |
| KR | 20090099599 | A | 9/2009 |
| KR | 20180064736 | A | 6/2018 |

* cited by examiner

*Primary Examiner* — Charles I Boyer

(74) *Attorney, Agent, or Firm* — Lempia Summerfield Katz LLC

(57) ABSTRACT

A cleaner composition has a solvent, a surfactant, a natural extract, and an additive. The cleaner composition has excellent antibacterial properties by using a natural extract including small amounts of a sage extract, a eucalyptus extract, or a combination thereof of the sage extract and the eucalyptus extract. The cleaner composition has an odor bactericidal capability of 99% or more. The cleaner composition has an air-conditioning odor reduction effect and has low harmfulness against the human body.

4 Claims, No Drawings

ANTIMICROBIAL CLEANING COMPOSITION COMPRISING A SYNERGISTIC COMBINATION OF SAGE AND EUCALYPTUS EXTRACT

CROSS-REFERENCE TO RELATED APPLICATION

This application claims under 35 U.S.C. § 119(a) the benefit of priority to Korean Patent Application No. 10-2021-0108449 filed on Aug. 18, 2021, the entire contents of which are incorporated herein by reference.

BACKGROUND

(a) Technical Field

The present disclosure relates to a cleaner composition, and more particularly, the present disclosure is characterized by providing a cleaner composition having excellent antibacterial properties by using a natural extract including small amounts of a sage extract and a eucalyptus extract.

(b) Background Art

An evaporator cleaner (or "evacleaner") is a cleaner used for the purpose of reducing odors and cleaning contamination in the evaporator within HVAC. The evaporator cleaner includes water, which is a basic solvent, ethanol, surfactant, etc. for cleaning, a foaming liquid for spraying, and flavoring substances such as lavender and lemon flavor for reducing odor and emitting a good flavoring agent.

Conventional evaporator cleaners use combinations of surfactants and simple alcohols such as ethanol, and synthetic disinfectants such as 2-Octyl-3(2H)-isothiazolone (OIT).

When using high-performance synthetic disinfectants such as OIT, it has been confirmed that the residual material before/after cleaning has a harmful effect on the human body due to the breathing characteristics so that there is a problem in that it is difficult to use them.

However, there is a problem in that general cleaning agents lack removal performance of an odor generated by re-proliferation of odor bacteria due to the lack of an odor bactericidal ability in the evaporator.

SUMMARY OF THE DISCLOSURE

An object of the present disclosure is to provide a cleaner composition having an odor bactericidal ability of 99% or more.

Another object of the present disclosure is to provide a cleaner composition which has an air-conditioning odor reduction effect and has low harmfulness against the human body.

The objects of the present disclosure are not limited to the objects mentioned above. The objects of the present disclosure should be clear from the following description and should be realized by the and combinations thereof described in the claims.

A cleaner composition according to an embodiment may include a solvent, a surfactant, a natural extract, and an additive. The natural extract may include a sage extract, a eucalyptus extract, or a combination thereof.

The solvent may include water and an alcohol.

The surfactant may include sodium lauryl ether sulfate.

The cleaner composition may include 68% by weight to 80% by weight of the solvent, 0.5% by weight to 3% by weight of the surfactant, 0.3% by weight to 2.5% by weight of the natural extract, and 20% by weight to 32% by weight of the additive.

The additive may include a foaming agent, an antifungal agent, a flavoring agent, or a combination thereof.

The cleaner composition may include 68% by weight to 80% by weight of the solvent, 0.5% by weight to 3% by weight of the surfactant, 0.3% by weight to 2.5% by weight of the natural extract, 20% by weight to 30% by weight of the foaming agent, 0.2% by weight to 0.5% by weight of the antifungal agent, and 0.05% by weight to 0.1% by weight of the flavoring agent.

The natural extract may include the sage extract and the eucalyptus extract.

The cleaner composition may include 68% by weight to 80% by weight of the solvent, 0.5% by weight to 3% by weight of the surfactant, 20% by weight to 30% by weight of the additive, 0.15% by weight to 0.20% by weight of the sage extract, and 0.15% by weight to 0.20% by weight of the eucalyptus extract.

According to the present disclosure, it is possible to provide a cleaner composition having an odor bactericidal ability of 99% or more.

According to the present disclosure, it is possible to provide a cleaner composition which has an air-conditioning odor reduction effect and has low harmfulness against the human body.

The effects of the present disclosure are not limited to the above-mentioned effects. It should be understood that the effects of the present disclosure include all effects that can be inferred from the following description.

DETAILED DESCRIPTION

The above objects, additional objects, features, and advantages of the present disclosure should be understood through the following embodiments. The present disclosure is not limited to the embodiments described herein and may be embodied in other forms. Rather, the embodiments introduced herein are provided so that the disclosed content may become thorough and complete and so that the spirit of the present disclosure may be sufficiently conveyed to those skilled in the art.

In the present specification, terms such as "comprise", "have", etc. are intended to designate that a feature, number, step, operation, component, part, or a combination thereof described in the specification exists. However, it should be understood that the terms do not preclude the possibility of the existence or addition of one or more other features, numbers, steps, operations, components, parts, or combinations thereof. Further, when a part of a layer, film, region, plate, etc. is said to be "on" another part, this includes not only the case where it is "directly on" the other part but also the case where there is another part in the middle thereof. Conversely, when a part of a layer, film, region, plate, etc. is said to be "under" another part, this includes not only the case where it is "directly under" the other part, but also the case where there is another part in the middle thereof.

Unless otherwise specified, because all numbers, values, and/or expressions expressing quantities of components, reaction conditions, polymer compositions, and formulations used in the present specification are approximate values reflecting various uncertainties of the measurement that arise in obtaining these values among others in which these numbers are different, these should be understood as being modified by the term "about" in all cases. Further, when a numerical range is disclosed in this description, such a range is continuous, and includes all values from a minimum value of such a range to a maximum value including the maximum value, unless otherwise indicated. Furthermore, when such a range refers to an integer, all integers including from a minimum value to a maximum value including the maximum value are included, unless otherwise indicated.

The present disclosure relates to a cleaner composition, and more particularly, the present disclosure is characterized by providing a cleaner composition having excellent anti-bacterial properties by using a natural extract including small amounts of a sage extract and a eucalyptus extract.

The cleaner composition according to the present disclosure includes a solvent, a surfactant, a natural extract, and an additive.

The solvent may include water and an alcohol, and the alcohol may include ethanol but is not limited to such a compound.

The alcohol has basic bactericidal properties and evaporation properties that may affect the duration and cleaning ability of the cleaner composition as a whole.

The cleaner composition according to the present disclosure may include 68% by weight to 80% by weight of the solvent.

The solvent includes water and alcohol at a weight ratio in a range of 65:35 to 75:25.

The surfactant may include sodium lauryl ether sulfate.

Contaminants such as dust may be separated and removed by being emulsified/hydrated by the surfactant.

The cleaner composition according to the present disclosure includes 0.5% by weight to 3% by weight of the surfactant.

The natural extract may include a sage extract, a eucalyptus extract, or a combination thereof.

The cleaner composition according to the present disclosure includes 0.3% by weight to 2.5% by weight of the natural extract.

When the natural extract includes only the sage extract, the cleaner composition according to the present disclosure may include 1.0% by weight or more of the sage extract. In this case, when the sage extract is used in an amount of less than 1.0% by weight, the odor bactericidal effect may not be sufficiently working.

When the natural extract includes only the eucalyptus extract, the cleaner composition according to the present disclosure may include 1.5% by weight or more of the eucalyptus extract. In this case, when the eucalyptus extract is used in an amount of less than 1.5% by weight, the odor bactericidal effect may not be sufficiently working.

The natural extract according to the present disclosure may include both the sage extract and the eucalyptus extract. In one example, the cleaner composition may include 0.3% by weight to 0.4% by weight of the natural extract. That is, when checking the cleaning power by mixing the sage extract and the eucalyptus extract, the effect of the microbial cleaning power has been varied depending on the mixing content, and when the extracts are mixed compared to when extracts are each used separately, a synergistic effect of further increasing the cleaning power can be obtained.

When the natural extract includes both the sage extract and the eucalyptus extract, the cleaner composition includes 0.15% by weight to 0.20% by weight of the sage extract and includes 0.15% by weight to 0.20% by weight of the eucalyptus extract.

The additive may include a foaming agent, an antifungal agent, a flavoring agent, or a combination thereof.

The cleaner composition according to the present disclosure may include 20% by weight to 32% by weight of an additive.

The additive may include the foaming agent, the antifungal agent, and the flavoring agent. In one example, the cleaner composition includes 20% by weight to 30% by weight of the foaming agent, 0.2% by weight to 0.5% by weight of the antifungal agent, and 0.05% by weight to 0.1% by weight of the flavoring agent.

Hereinafter, the present disclosure is described in more detail through specific Examples. However, these Examples are for illustrating the present disclosure, and the scope of the present disclosure is not limited thereto.

EXAMPLES AND COMPARATIVE EXAMPLES

Cleaner compositions were prepared with the compositions shown in Table 1 below.

TABLE 1

| Classification | Water (% by weight) | Ethanol (% by weight) | Surfactant (% by weight) | Natural extract: Sage extract (% by weight) | Natural extract: Eucalyptus extract (% by weight) | Foaming agent (% by weight) | Antifungal agent (% by weight) |
|---|---|---|---|---|---|---|---|
| Example 1 | 51.8 | 23 | 0.65 | — | 1.5 | 22.75 | 0.3 |
| Example 2 | 49.3 | 23 | 0.65 | — | 2 | 22.75 | 0.3 |
| Example 3 | 48.8 | 23 | 0.65 | — | 2.5 | 22.75 | 0.3 |
| Example 4 | 50.3 | 23 | 0.65 | 1.0 | — | 22.75 | 0.3 |
| Example 5 | 51.8 | 23 | 0.65 | 1.5 | — | 22.75 | 0.3 |
| Example 6 | 49.3 | 23 | 0.65 | 2 | — | 22.75 | 0.3 |
| Example 7 | 48.8 | 23 | 0.65 | 2.5 | — | 22.75 | 0.3 |
| Example 8 | 51 | 23 | 0.65 | 0.15 | 0.15 | 22.75 | 0.3 |
| Example 9 | 49.05 | 23 | 0.65 | 0.2 | 0.15 | 22.75 | 0.3 |
| Example 10 | 50.9 | 23 | 0.65 | 0.2 | 0.2 | 22.75 | 0.3 |
| Comparative Example 1 | 53.3 | 23 | 0.65 | — | — | 22.75 | 0.3 |
| Comparative Example 2 | 51.2 | 23 | 0.65 | — | 0.1 | 22.75 | 0.3 |
| Comparative Example 3 | 51.15 | 23 | 0.65 | — | 0.15 | 22.75 | 0.3 |
| Comparative Example 4 | 51.1 | 23 | 0.65 | — | 0.2 | 22.75 | 0.3 |

TABLE 1-continued

| | | | | Natural extract | | | |
|---|---|---|---|---|---|---|---|
| Classification | Water (% by weight) | Ethanol (% by weight) | Surfactant (% by weight) | Sage extract (% by weight) | Eucalyptus extract (% by weight) | Foaming agent (% by weight) | Antifungal agent (% by weight) |
| Comparative Example 5 | 50.8 | 23 | 0.65 | — | 0.5 | 22.75 | 0.3 |
| Comparative Example 6 | 50.3 | 23 | 0.65 | — | 1.0 | 22.75 | 0.3 |
| Comparative Example 7 | 51.2 | 23 | 0.65 | 0.1 | — | 22.75 | 0.3 |
| Comparative Example 8 | 51.15 | 23 | 0.65 | 0.15 | — | 22.75 | 0.3 |
| Comparative Example 9 | 51.1 | 23 | 0.65 | 0.2 | — | 22.75 | 0.3 |
| Comparative Example 10 | 50.8 | 23 | 0.65 | 0.5 | — | 22.75 | 0.3 |

* Surfactant (Humantech)
* Foaming agent (Humantech)
* Ethanol (Sigma-Aldrich)
* Sage Extract (Samjung Flavor)
* Eucalyptus Extract (Sigma-Aldrich)

Measurement Method

Microbial Cleaning Power (Bactericidal Properties)

Proceed with a KS 0693 and ASTM-E2149 method. Wet a cultured odor microbial inoculation liquid in a standard cotton cloth and contact it with each cleaner sample at room temperature for 30 minutes. Thereafter, take the standard cotton cloth out of the cleaner sample and detach it. Then plate it on a solid medium to measure the number of viable cells and compare the number of viable cells after each cleaner treatment with the control group to measure the sterilization performance.

Physical Cleaning Power

Proceed through a visual evaluation and dust weight measurement method.

Prepare a 5 cm*5 cm aluminum plate simulating aluminum fin material, measure the initial weight of the plate, and hydrate the A2 dust, which is the ISO standard dust, to treat it on the plate. After drying is performed, and the dust is coated on the plate, it is weighed before cleaner treatment. Further, after applying 20 ml of the cleaner liquid, performing visual evaluation and cleaner treatment are performed and then weighing is performed. After performing application of distilled water to the plate, visual evaluation, and treatment with distilled water, the resulting materials are weighed and compared.

25 types of malodorous microorganisms used in the experiments are as shown in Table 2 below.

TABLE 2

| Classification | Odor strain name |
|---|---|
| 12 types of main malodorous strains | *Methylobacterium dankookense* |
| | *Methylobacterium phyllosphaerae* |
| | *Methylobacterium tardum* |
| | *Microbacterium flavescens* |
| | *Sphingomonas dokdonensis* |
| | *Sphingomona ginsenosidimutans* |
| | *Sphingomonas numi* |
| | *Sphingomonas melonis* DAPP-PG 224 |
| | *Staphylococcus nominis* |
| | *Staphylococcus warneri* |
| | *Methylobacterium radiotolerans* |
| | *Microbacterium trichothecenolyticum* |
| 13 types of malodorous strains | *Bacillus megaterium* |
| | *Janibacer melonis* |
| | *Skermanella aerolata* |
| | *Massilia suwonensis* |
| | *Microbacterium foliorum* |
| | *Sphingomonas aquatilis* |
| | *Methylobacterium aquaticum* |
| | *Gordonia polyisoprenivorans* |
| | *Bacillus aryabhattai* |
| | *Microbacterium laevaniformans* |
| | *Microbacterium testaceum* |
| | *Rahnella aquatilis* |
| | *Bacillus simplex* |

EXPERIMENTAL EXAMPLE

Bactericidal properties and physical cleaning power were measured for the cleaner compositions prepared in Examples and Comparative Examples. The results are shown in Table 3 below.

TABLE 3

| | Physical properties | | |
|---|---|---|---|
| | | Bactericidal properties | |
| Classification | Physical cleaning power | 12 types of main malodorous strains | 13 types of malodorous strains |
| Example 1 | ◎ | 99% | 99% |
| Example 2 | ◎ | 99% | 99% |
| Example 3 | ◎ | 99% | 99% |
| Example 4 | ◎ | 99% | 99% |
| Example 5 | ◎ | 99% | 99% |
| Example 6 | ◎ | 99% | 99% |
| Example 7 | ◎ | 99% | 99% |
| Example 8 | ◎ | 99% | 99% |
| Example 9 | ◎ | 99% | 99% |
| Example 10 | ◎ | 99% | 99% |
| Comparative Example 1 | ○ | 34.85% | 42% |
| Comparative Example 2 | ◎ | 45% | 72% |
| Comparative Example 3 | ◎ | 46.8% | 91.4% |
| Comparative Example 4 | ◎ | 43.8% | 99.4% |
| Comparative Example 5 | ◎ | 70.8% | 99.4% |
| Comparative Example 6 | ◎ | 73% | 99.9% |

TABLE 3-continued

| Classification | Physical properties | | |
|---|---|---|---|
| | | Bactericidal properties | |
| | Physical cleaning power | 12 types of main malodorous strains | 13 types of malodorous strains |
| Comparative Example 7 | ◎ | 58.9% | 70.5% |
| Comparative Example 8 | ◎ | 85.9% | 76.3% |
| Comparative Example 9 | ◎ | 92.9% | 79% |
| Comparative Example 10 | ◎ | 92.8% | 99.9% |

What is claimed is:

1. A cleaner composition comprising:

A) 0.5% by weight to 3% by weight of a sodium lauryl ether sulfate surfactant;

B) a natural extract comprising:

i) 0.15% by weight to 0.2% by weight sage extract; and ii) 0.15% by weight to 0.2% by weight eucalyptus extract;

C) 20% by weight to 32% by weight of an additive; and

D) 68% by weight to 80% by weight of a solvent.

2. The cleaner composition of claim 1, wherein the solvent comprises water and an alcohol.

3. The cleaner composition of claim 1, wherein the additive comprises a foaming agent, an antifungal agent, a flavoring agent, or a combination thereof.

4. The cleaner composition of claim 3, comprising:

20% by weight to 30% by weight of the foaming agent;

0.2% by weight to 0.5% by weight of the antifungal agent; and 0.05% by weight to 0.1% by weight of the flavoring agent.

* * * * *